April 16, 1963   J. P. SAUBER ET AL   3,085,362
GAME TRAP
Filed March 30, 1961   2 Sheets-Sheet 1

INVENTORS
JOHN P. SAUBER
ROBERT C. WEISBRICH
BY
Caswell, Lagaard & Wicks
ATTORNEYS April 16, 1963  J. P. SAUBER ET AL  3,085,362
GAME TRAP
Filed March 30, 1961  2 Sheets-Sheet 2

INVENTORS
JOHN P. SAUBER
ROBERT C. WEISBRICH
BY
Caswell, Lagaard & Nicks
ATTORNEYS 3,085,362
GAME TRAP
John P. Sauber, 110 8th St., and Robert C. Weisbrich,
201 Walnut St., both of Farmington, Minn.
Filed Mar. 30, 1961, Ser. No. 99,512
2 Claims. (Cl. 43—69)

The invention relates to an improvement in traps, more particularly to game traps and specifically to a trap for catching pigeons.

It is an object of the invention to provide a trap which will not injure game or kill the same but keep it alive in a humane manner.

It is also an object to provide a trap which is easily baited and it is virtually impossible for the bait to be removed without springing the trap.

It is a further object to provide a trap which is devoid of springs, latches or catches which must be kept in adjustment and set.

It is a still further object to provide a trap having two game-catching compartments one of which is always open and ready, and when one of the compartments is used the remaining compartment is automatically set for game catching. It is also an object to provide a trap having means for adjusting the sensitivity of the trap.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

Figure 1:
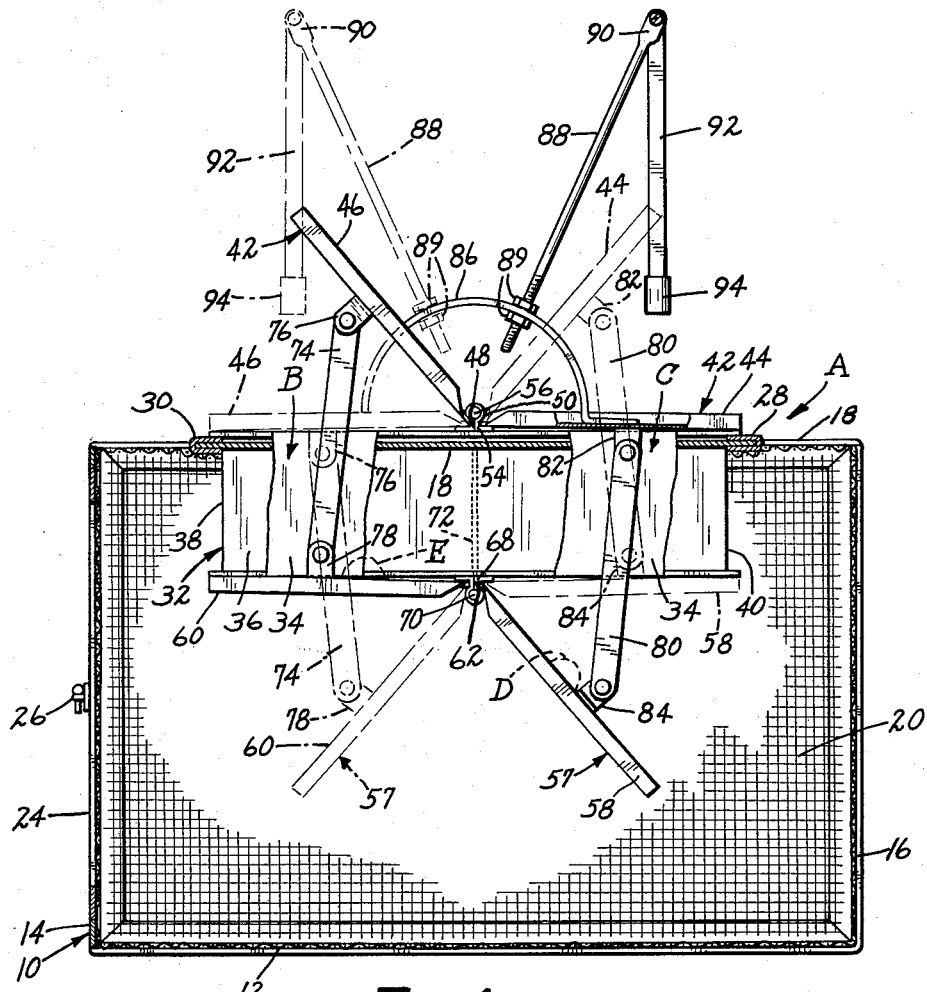
FIGURE 1 is a longitudinal sectional view of the trap on the line 1—1 of FIGURE 2, portions of which are broken away, the alternate position of the top and trap doors being shown in broken lines.
Figure 2:
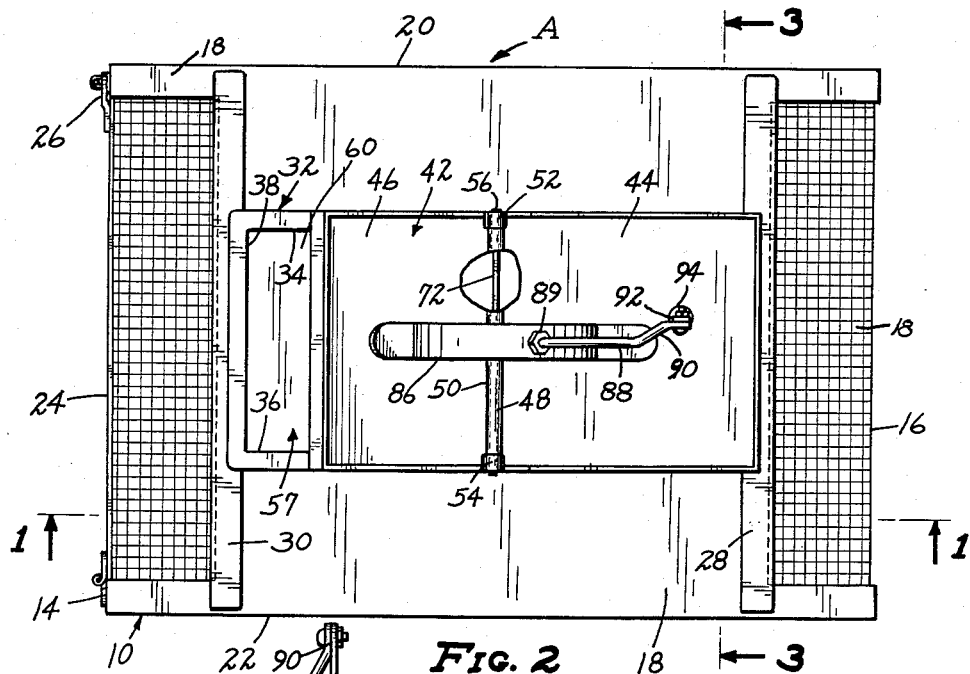
FIGURE 2 is a top plan view of the trap.
Figure 3:
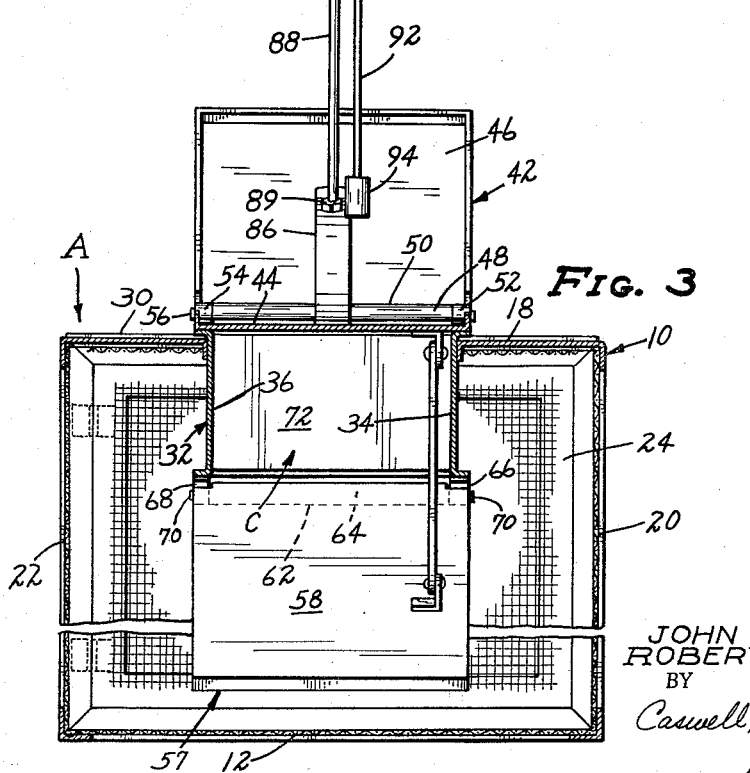
FIGURE 3 is a sectional view on the line 3—3 of FIGURE 2.

Referring to the drawings in detail, the trap A includes the box-like container 10 which is formed of the bottom wall 12, the end walls 14 and 16, the top wall 18, and the side walls 20 and 22. The side, end and bottom walls are generally formed of open wire mesh to provide air for the trapped game. The end 14 is provided with a hinged door 24 having the latch 26 whereby the door may be locked. The door 24 is used to remove the trapped game.

The top 18 includes the two transverse supports 28 and 30 and secured to and depending from the supports 28 and 30 is the chamber 32 including the spaced longitudinal walls 34 and 36 and the transverse end walls 38 and 40. Further provided is the top double door 42 consisting of the half door portion 44 and the half door portion 46 rigidly connected at the inner ends at 48 to form an obtuse angle or V-shaped top double door 42. A hinge portion 50 is formed at the apex or point of connection, 48 of the door portions 44 and 46, and short hinge portions 52 and 54 are formed on the upper edge of each of the walls 34 and 36, respectively. The top double door 42 is hingedly mounted on the top of the chamber 32 by means of the hinge pin 56 extending through the hinge portions 50, 52 and 54. The top double door 43 may be made of one piece of material formed at an obtuse angle to form the door portions 44 and 46.

The numeral 57 designates a lower trap double door consisting of the half door portion 58 and the half door portion 60 connected at the inner ends at 62 to form an obtuse angle or V-shaped double door. A hinge portion 64 is formed at the apex or point of intersection, 62, of the door portions 58 and 60 and hinge portions 66 and 68 are formed on the lower edges of the walls 34 and 36, respectively. As is the case with the top double door 42, the double trap door 57 may be made in one piece in the same manner. The double trap door 57 is hingedly mounted on the walls 34 and 36 by means of the pin 70 extending through the hinge portions 64, 66 and 68. The trap door 57 is mounted in direct alignment below and in spaced relation to the top door 42.

The angular relation between the half door portions 44 and 46 is the same as that between the half door portions 58 and 60 whereby the door portions 46 and 58 are parallelly disposed and the door portions 44 and 60 are parallelly disposed thereby allowing the parallelly disposed and unopposed door portions to be positioned upon the enclosure 32.

Further provided is the vertical dividing wall 72 which divides the chamber 32 into two substantially equal parts or areas designated as B and C. The wall 72 is substantially in coplanar relationship with the hinge pins 56 and 70. The size of the chamber 32 and the resultant distance between the double doors 42 and 57 depends upon the size of the game desired to be trapped.

The half door portion 46 of the top double door 42 is connected to the half door portion 60 of the lower trap double door 57 by means of the link 74 and the pin connection to the upstanding ears 76 and 78 of the door portions 46 and 60, respectively. Similarly the half door portion 44 of the top double door 42 is pivotally connected to the half door portion 58 of the trap door 57 by means of the link 80 and the pin connection to the upstanding ears 82 and 84 of the door portions 44 and 58, respectively. The links 74 and 80 are offset with regard to the longitudinal center of the double doors 42 and 57 so that there is sufficient room within the areas B and C for entrance of the game to be trapped.

Further provided is the pendulum base support 86 which is connected to the door portion 46 and the door portion 44. The elongated pedulum support arm 88 is secured at its lower end centrally of the base support by means of the nuts 89 and it bisects the angle formed by the door portions 46 and 44. The upper end of the pendulum support 88 is formed with the offset portion 90, and pivotally connected to the offset 90 is the weight arm 92. The weight arm 92 has connected to the lower end thereof, the weight 94. The length of the pendulum support arm 88 is adjustable in length by means of the nuts 89 whereby the pressure necessary on the door 58 or 60 to spring the trap is greater or less thereby regulating the sensitivity of the trap. With an increase in the length of the arm 88 greater pressure is needed to depress a lower door portion.

In using the trap A, a piece of bait, such as D and E is secured to the upper surface of both lower trap door portions 58 and 60 respectively. Looking at FIGURE 1 let it be supposed that a pigeon or small animal enters the area B and steps onto the trap door portion 60 to pick up the bait E thereon. The door portion 60 falls or pivots downwardly into the container 10, thereby precipating the game down into the container 10. The door portion 46 is closed as a result of the link connection 74 as shown in the broken lines in FIGURE 1. As a further result of the above the door portion 58 pivots upwardly and is closed, as shown in broken lines in FIGURE 1, and the door portion 44 opened thereby automatically setting the area C as a ready trap with the bait D available.

It will be seen that as the pendulum 94 passes over vertical dead center, the upper door portion approached by the pendulum will close with a corresponding opening of the other top door portion. Thus the trap A can be set for two successive trapping operations. When one trap is operated the other is automatically set. In addition, the container 10 may be enlarged and a number of chamber units 32 can be mounted on the top of a single large container in tandem. Also the trap A may be buried in the ground up to the top level for trapping animals.

The invention is not to be understood as restricted to the details set forth since these may be modified within the scope of the appended claims without departing from the spirit and scope of the invention.

Having thus described the invention, what is claimed as new and desired to be secured by Letters Patent is:

1. In a game trap, a container having a top wall and enclosing side and bottom walls, said top wall having an opening formed therein, a pair of top doors secured at the inner ends thereof to form an obtuse angle, a walled member connected to said top wall and depending therefrom the upper edge of which is substantially coterminous with said top opening, a transverse wall dividing the area defined by said depending walled member into two compartments, a pair of trap doors secured at the inner ends thereof to form an obtuse angle, said top doors hingedly connected at the apex thereof to said top wall, wall, said trap doors hingedly connected at the apex thereof to the lower edge of said depending walled member in juxtaposition to said top doors, link means connecting said top doors and said trap doors, counterbalancing means mounted on said top doors whereby the depression and opening of one of said trap doors from the horizonal closes the top door above it and closes the remaining trap door thereby opening the remaining top door.

2. In a game trap, a container having top, bottom, end, and side walls, said top wall having an opening formed therein, first and second upper doors rigidly secured at their inner ends at an obtuse angle, said doors hingedly connetced at the point of securement one to the other to said top wall and centrally of said opening, a wall member depending from said top wall at the edges of said top opening downwardly into said contatiner, third and fourth lower bait-receiving doors rigidly secured at their inner ends at an obtuse angle substantially equal to that of said first and second upper doors, said third and fourth lower doors hingedly connected at the point of securement to each other to said depending wall member and centrally thereof, a counterbalance including an upright pendulum arm secured to said first and second doors and extending therefrom so as to bisect the obtuse angle formed by said doors, a weight pivotally connected to the upper end of said pendulum arm whereby either of said first and second doors is held closed upon said opening, link means pivotally connected to said first and third doors, link means pivotally connected to said second and fourth doors so that when said fourth door is pivotally depressed and opened from said depending wall said second door is pivotally closed upon said top wall opening, said first door is pivotally closed upon said depending wall member.

References Cited in the file of this patent

UNITED STATES PATENTS

| | | |
|---|---|---|
| 189,346 | Early | Apr. 10, 1877 |
| 864,200 | Shelton | Aug. 27, 1907 |
| 1,006,701 | Sutemeier | Oct. 24, 1911 |
| 1,022,115 | Walcott | Apr. 2, 1912 |
| 2,252,908 | Wittlief | Aug. 19, 1941 |